United States Patent [19]

Ratu et al.

[11] Patent Number: 5,467,970
[45] Date of Patent: Nov. 21, 1995

[54] VEHICLE SUSPENSION SYSTEM WITH JOUNCE BUMPER

[75] Inventors: John J. Ratu, Carson City; Alvin K. Jones, Romeo; Charles K. Maddox, Linden, all of Mich.

[73] Assignee: General Motors Corporation, Detroit, Mich.

[21] Appl. No.: 254,731

[22] Filed: Jun. 6, 1994

[51] Int. Cl.⁶ .................................... F16F 5/00
[52] U.S. Cl. .................... 267/220; 267/152; 267/153
[58] Field of Search ................ 267/140, 140.11, 267/292, 220, 152, 153, 33, 140.4, 140.3; 280/671, 675, 716, 666, 670, 696, 701, 724, 685, 687, 671; 293/136

[56] References Cited

U.S. PATENT DOCUMENTS

| | | | |
|---|---|---|---|
| 3,781,033 | 12/1973 | Buchwald | 280/124 |
| 4,462,608 | 7/1984 | Lederman | 280/668 |
| 4,611,795 | 9/1986 | Muzechur | 267/220 |
| 4,934,667 | 6/1990 | Pees et al. | 267/64.21 |
| 5,186,440 | 2/1993 | Schobbe | 267/220 |
| 5,238,233 | 8/1993 | Hein | 280/716 |

FOREIGN PATENT DOCUMENTS 2214607  6/1989  United Kingdom.

Primary Examiner—Robert J. Oberleitner
Assistant Examiner—Clifford T. Bartz
Attorney, Agent, or Firm—Anthony Luke Simon

[57] ABSTRACT

A motor vehicle suspension system with a jounce bumper comprising a rigid support having a rigid cylindrical wall, an outer bumper member having an open end and a substantially closed end, the outer bumper member defining a cylindrical passage bordered by an inner cylindrical wall at its open end, wherein the open end is mounted radially interior of the rigid cylindrical wall, and an inner bumper member of cylindrical shape and size to fit within he cylindrical passage, having a radially exterior surface radially interfering with a predetermined axial length of the inner cylindrical wall, wherein, during compression of the outer bumper member, the inner bumper member cooperates with the rigid cylindrical wall to trap the open end of the outer bumper member, wherein the spring rate of the outer bumper is passively increased by the inner bumper cooperating with the rigid cylindrical wall.

10 Claims, 4 Drawing Sheets

VEHICLE SUSPENSION SYSTEM WITH JOUNCE BUMPER

This invention relates to automotive suspension systems including jounce bumpers.

BACKGROUND OF THE INVENTION

One form of automotive suspension includes a coil spring seated in a lower seat in a wheel assembly and seated in an upper seat in the vehicle body or frame. The spring supports the weight of the vehicle and allows for reciprocating relative movement between the wheel and vehicle during road travel to isolate wheel disturbances from the vehicle body. Typically, a form of stop is provided between the vehicle wheel or axle and the vehicle body to limit travel of the wheel in the direction of the body and to prevent a metal surface the wheel or axle from "bottoming out" against the vehicle body metal. These stops are typically made of rubber or plastic urethane foam and are referred to as jounce bumpers.

Referring to FIG. 1, an example prior art suspension jounce bumper is shown. The jounce bumper 20 comprises two molded components, the bumper 22 and the additional isolator 24. The bumper 22 is molded from a plastic urethane foam and the isolator 24 is molded from a natural rubber, or alternatively, from urethane. In the vehicle suspension system, the radially extending portion 26 of jounce bumper assembly 20 is seated between a spring seat on a wheel assembly and a coil spring to serve as a bumper and travel limit between the vehicle wheel assembly and the vehicle body. The rubber spring isolator 24 in combination with the radially extending portion 26 of the jounce bumper 22 aid to isolate the high frequency component of wheel motion from the spring and vehicle body.

During a large magnitude suspension event, such as the vehicle wheel running over an object in the road or traveling through a series of potholes, the jounce bumper assembly 20 may contact a stop in the vehicle body and elastically deform responsive to the force of the contact of the jounce bumper assembly 20 against the vehicle body. As elastic deformation increases, the force provided by the bumper also increases, increasing to a limit at which the bumper stops the relative movement of the wheel assembly toward the vehicle body.

SUMMARY OF THE PRESENT INVENTION

Advantageously, this invention provides a vehicle suspension system with a new jounce bumper structure.

Advantageously, this invention provides a vehicle suspension system including a new combination jounce bumper and spring seat.

Advantageously, this invention provides, in a vehicle suspension system, a combination jounce bumper and spring seat that utilizes in the jounce bumper portion, a urethane bumper component and a rubber bumper component.

Advantageously, during suspension system events in which the jounce bumper according to this invention is used as an aid to slow and stop relative movement of the vehicle wheel towards the body, an outer bumper, mounted for example to the body side of a coil spring and comprising the urethane component, is deflected when the wheel assembly first contacts the bumper to provide a first force versus deflection curve for the jounce bumper. During greater compression of the jounce bumper, the inner bumper, which is the rubber portion of the jounce bumper, is also deflected, providing a passive increase in the force versus deflection curve of the outer bumper.

More particularly, the inner bumper is located in a cylindrical cavity of the outer bumper and has a radially exterior surface that radially interfaces with an inner surface of the cavity of the outer bumper over a predetermined axial length of the inner and outer bumpers. The outer bumper is designed with voids that fill when the outer bumper begins to collapse during compression. As the voids begin to disappear due to the compression collapse of the outer bumper, the inner bumper also begins to undergo compression. Since the inner bumper has no voids to collapse to, the inner bumper reacts to the compression by generating a trapping force on the walls of the outer bumper surrounding the cylindrical cavity. These walls surrounding the cylindrical cavity receive the trapping force applied by the inner bumper and become trapped between the inner bumper, where the inner cylindrical wall of the outer bumper and the inner bumper interfere, and a cylindrical wall of a rigid support. As the trapping force between the inner bumper and the rigid support increases, the effective collapsing height or working height of the outer bumper is decreased, thus resulting in a passive increase in the outer bumper's spring compression rate, which is the force versus compression response, of the outer bumper.

The lower initial force versus deflection curve of the urethane member minimizes the generation of noise caused by axle or lower suspension component contact with the bumper and minimizes the affect of high frequency wheel movement on the vehicle body. The greater force versus deflection curve of the inner bumper and imposed on the outer bumper by the trapping action of the inner bumper ensures that, during extreme suspension events, suspension travel of the wheel towards the body is stopped by the jounce bumper.

Advantageously, this invention provides as structure for carrying out the advantages recited herein comprising: a rigid support having a rigid cylindrical wall; a first bumper member having an open end and a substantially closed end, the first bumper member defining a cylindrical passage bordered by an inner cylindrical wall at its open end, wherein the open end is mounted radially interior of the rigid cylindrical wall; and a second bumper member of cylindrical shape and size to fit within the cylindrical passage, having a radially exterior surface radially interfering with a predetermined axial length of the inner cylindrical wall; wherein during compression of the first bumper, the second bumper axially compresses and creates a radially outwardly directed force cooperating with the rigid cylindrical wall, resulting in a decrease in the potential compression of the first bumper, wherein the spring rate of the first bumper is passively increased by the inner bumper cooperating with the rigid cylindrical wall.

In one implementation, the advantages according to this invention as recited herein are achieved by the jounce bumper apparatus comprising: a first rigid support comprising a circular cylindrical first end and a radially flared second end; an elastomeric spring seat integrally molded to the radially flared second end of the first rigid support forming an annular body integral with and radially exterior of the flared end; a second rigid support having a rigid cylindrical wall; an outer bumper member having an open end and a substantially closed end, the outer bumper member defining a cylindrical passage bordered by an inner cylindrical wall at its open end, wherein the open end is mounted radially interior of the rigid cylindrical wall; and an inner bumper member of cylindrical shape and size to fit within the cylindrical passage, having a radially exterior surface radially interfering with a predetermined axial length of the inner cylindrical wall, wherein during compression of the outer bumper, the inner bumper axially compresses and creates a radially outwardly extending force, cooperating with the rigid cylindrical wall, resulting in a decrease in the potential compression of outer bumper, wherein the spring rate of the outer bumper is passively increased by the inner bumper cooperating with the rigid cylindrical wall.

A more detailed description of this invention, along with various embodiments thereof, is set forth below.

DETAILED DESCRIPTION OF THE INVENTION

Figure 2:
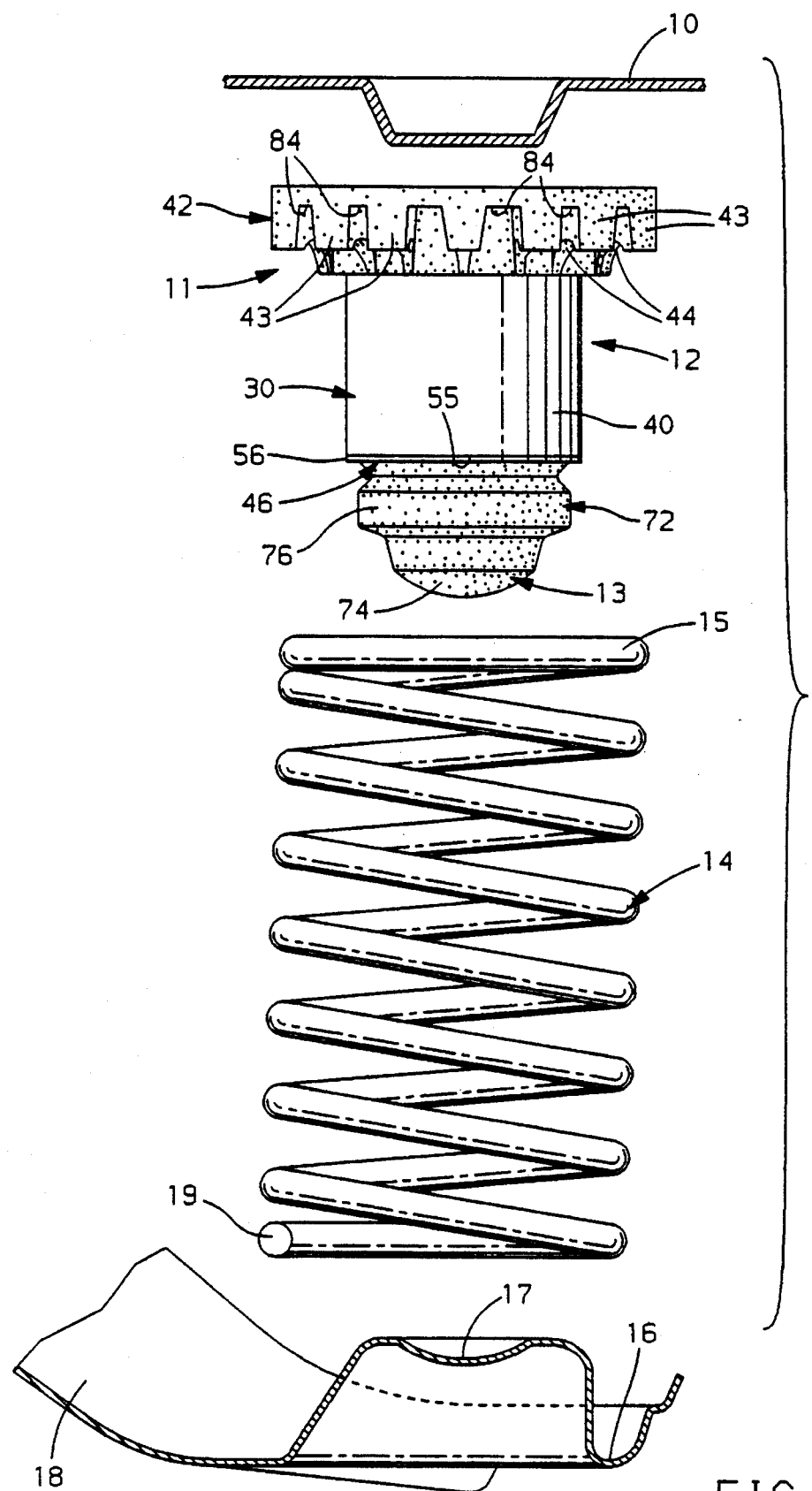

Referring now to FIG. 2, the members of a suspension system according to this invention are shown. A lower control arm 18 includes a spring seat 16 within which the lower end 19 of coil spring 14 rests. Radially inward of spring seat 16 is bumper stop 17 against which the bumper portion 13 of combination spring seat and jounce bumper 12 contacts during full contraction of the suspension. The upper portion 15 of spring 14 sits within spring seat 11 of combination spring seat and jounce bumper 12. Spring seat 11 includes elastomeric material such as rubber to isolate high frequency noise in the spring 14 from travelling to the vehicle body via upper spring seat 10. The top of the combination spring seat and jounce bumper 12 has a flared end including a radially extending end that sits over the seat 10 of the vehicle body or frame in a known manner.

The combination spring seat and jounce bumper 12 is held in place by the force of the spring 14 against the seat 10 of the frame or body, trapping the combination spring seat and jounce bumper 12 in place. As an option, during assembly or suspension repair, spring seat and jounce bumper 12 may be seated on seat 10 or spring 14 until the spring 14 is loaded to apply a trapping force between the spring 14 and seat 10.

Figure 1:
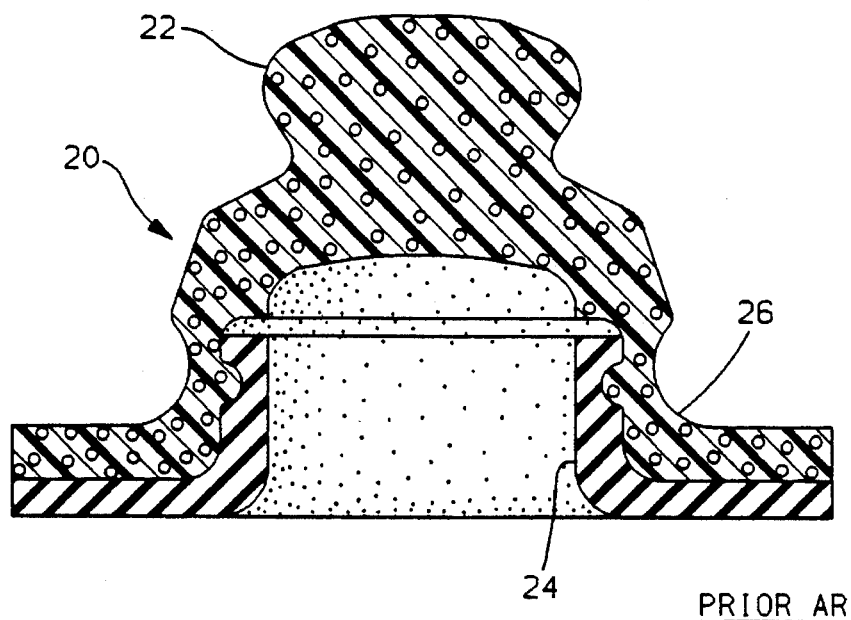
FIG. 1 illustrates a prior art jounce bumper.
Figure 3:
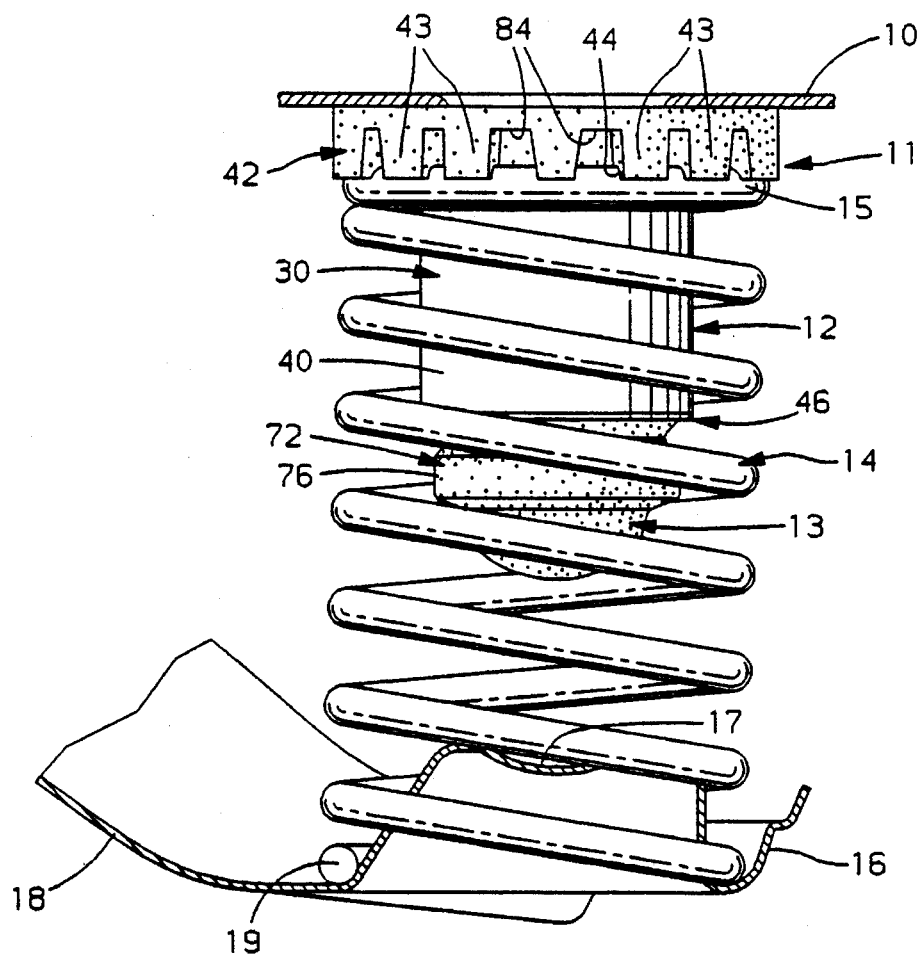
FIGS. 2 and 3 illustrate a suspension assembly according to this invention.

FIG. 3 illustrates the suspension system according to this invention in its assembled state in a vehicle, including upper seat 10 of the body or frame, combination spring seat jounce bumper 12, spring 14, lower spring seat 16 and control arm 18.

Figure 4:
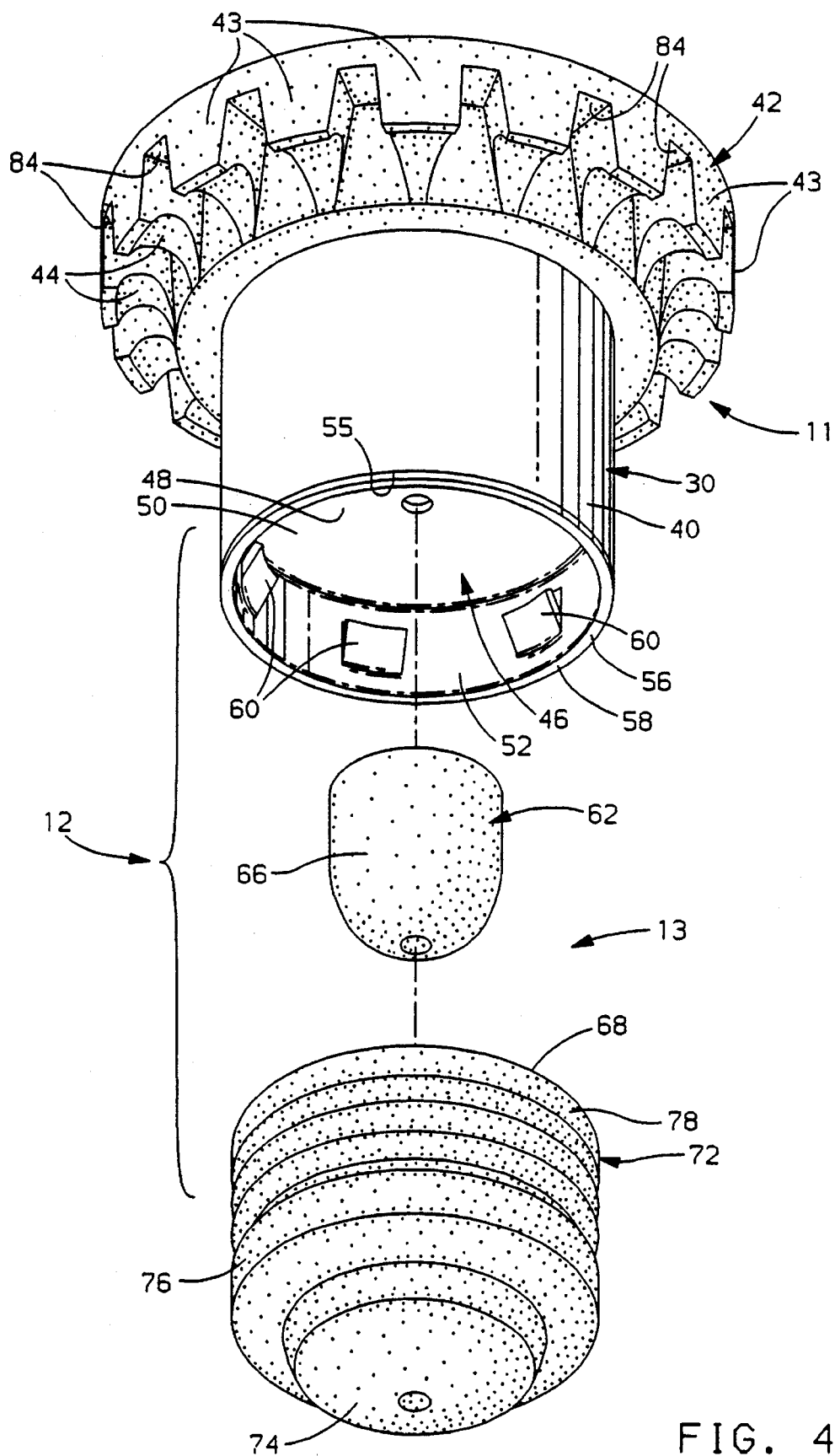
FIGS. 4 and 5 illustrate a combination spring seat and jounce bumper according to this invention.
Figure 5:
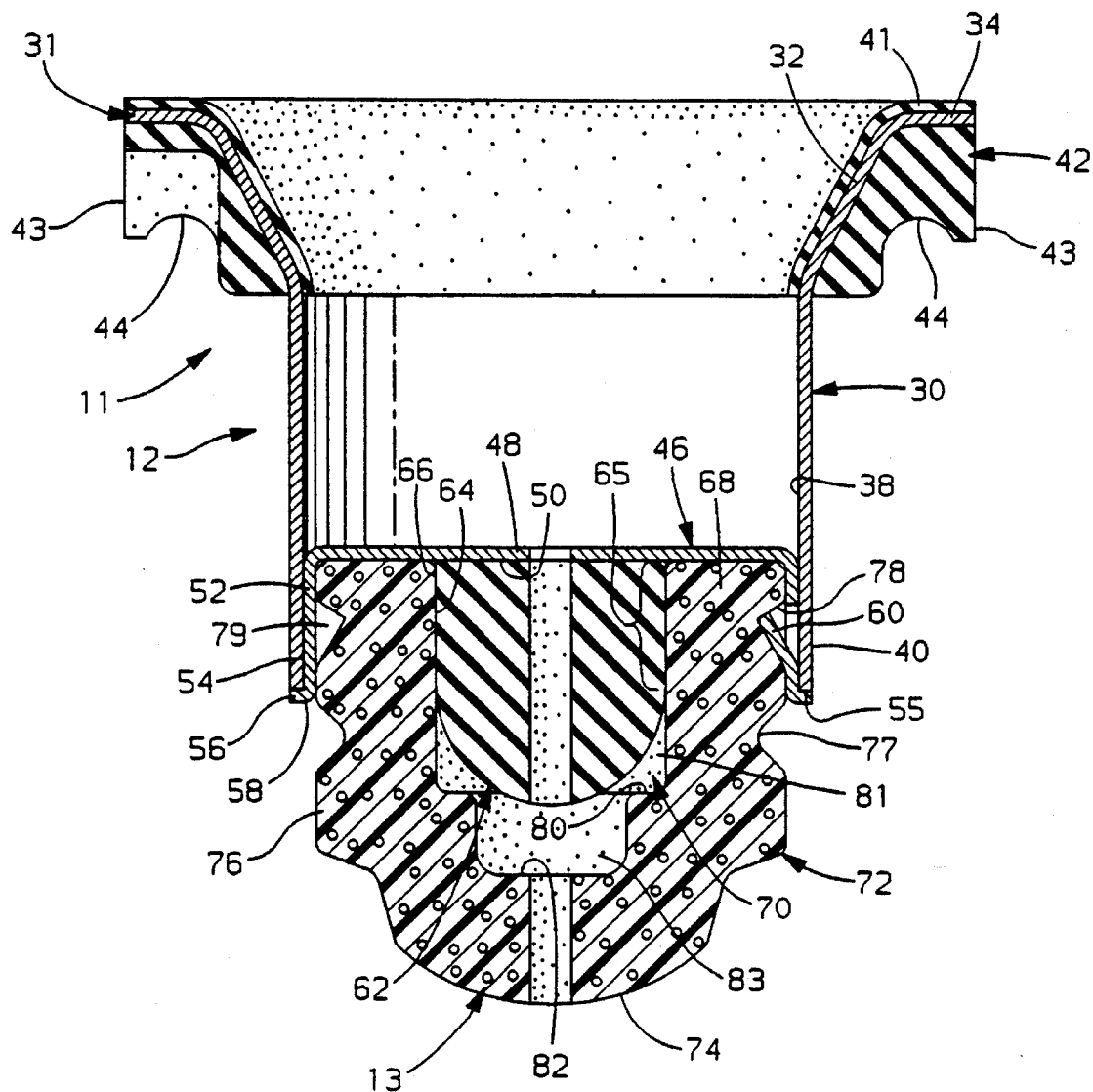

Referring now to FIGS. 4 and 5, the advantageous structure according to this invention for combination spring seat and jounce bumper 12 is illustrated in more detail. The combination spring seat and jounce bumper 12 includes a rigid body member 30 (the first rigid support) having a circular cylindrical end 40 axially extending to comprise a substantial portion of the body section of the rigid body member 30. A second end 31 of the rigid body member 30 includes a bell-shaped flare portion 32 and a radially extending flange 34. A suitable material for the rigid member 30 is steel. A rubber spring seat 42 is preferably integrally molded with the end 31 of the rigid member 30 to form an annular elastomeric body exterior of the flare 32. The integral molding of elastomeric material, such as rubber, onto rigid bodies, such as steel, is well known to those skilled in the art and the process need not be set forth in detail herein.

As shown in FIG. 5, a portion of the rubber 41 may be allowed to flow over to the interior of the flare 32 and to the axial exterior side of radially extending flange 34 so that the end 31 of the rigid body member 30 is completely encased in rubber. The annular rubber spring seat 42 may comprise a series of lugs 43 formed from the molded shape of the rubber spring seat 42. Each lug 43 has a circular concave seat portion 44 against which the spring rests to form spring seat 11. The use of the lugs 43 allows for tuning of the high frequency isolating effect between the spring and the body and the size, number and spacing of the lugs 43 can be changed to effect a different rate of seat compression and allow tuning to be optimized for the spring resonant frequencies.

At the circular cylindrical end 40 of the rigid body member 30, insert 46 (the second rigid support) is affixed in place. Insert 46 comprises a second rigid body member formed from, for example steel, that has a closed end 48, a cylindrical body 52 and an opened end 58. The cylindrical body 52 is circular in shape and the outer surface 54 thereof has a radius sized to cause slight interference with the inner surface 38 of the cylindrical portion 40 of rigid body member 30. Insert 46 is maintained in place by a press-fit and friction retention between the outer cylindrical surface 54 of the cylindrical body 52 of insert 46 and the inner surface 38 of the cylindrical end 40 of rigid body member 30. The opened end 58 of insert 46 has a flange 56 extending radially outward which acts as a stop to limit the distance that insert 46 may be pressed into the cylindrical end 40 of rigid body member 30. Flange 56 also acts as a radially converging "funnel" guide to ensure that bumper 72 collapses onto itself inside of insert 46. As shown, the flange 56 radially extends over the end 55 of the tube forming cylindrical end 40. A number of stamped fingers 60 extend radially to the interior of cylindrical body 52 of the insert 46 in the direction of the closed end 48. Insert 46 and its use of stamped fingers 60 to retain a bumper in place are well known to those skilled in the art and its use to retain the outer bumper 72 is not part of the invention claimed herein.

The resilient bumper 13 of the combination spring seat and jounce bumper comprises two parts, the first part, 72, is the outer bumper and the second part, 62, is the inner bumper or rubber bullet. The outer bumper 72 has a substantially closed end 74 and an opened end 68. The outer bumper 72 is substantially circular and cylindrical in shape and the opened end defines a cylindrical cavity 70. The outer bumper 72 has a set of ribs 76 that may be shaped to tune the deformation and spring characteristics of the outer bumper 72 in a known manner. Preferably, the outer bumper 72 is formed from microcellular urethane and example microcellular densities include 0.55 and 0.62 grams/cubic centimeter (g/cc). Since microcellular urethane is generally softer than hard rubber and has different/preferable damping characteristics (i.e., different in static to dynamic rates), outer bumper 72 provides a softer bumper that aids in eliminating ride harshness when the suspension contracts to the point where outer bumper 72 contacts the bumper stop 17 (FIG. 2) in the lower spring seat 16 (also FIG. 2) and is deformed responsive thereto.

More particularly, the damping characteristics of microcellular urethane during dynamic or fast compression events vary from static or slow compression events. During static compression events, urethane reacts much like rubber, with a spring-like response. During dynamic compression events, the damping rate of microcellular urethane increases at a high rate, much higher than rubber in comparable events, so that microcellular urethane acts as both a damper and a spring. An advantage achieved by the high dynamic damping of microcellular urethane is that, after a strong dynamic compression, microcellular urethane does not have as strong a rebound, or kick-back, as rubber. When a rubber jounce bumper compresses because a lower suspension member bottomed out to the vehicle body, the rubber jounce bumper wants to immediately release its stored energy, providing a spring expansion force between the vehicle body and the bottomed out lower suspension member. This force may induce a certain harshness or noise into the suspension event that is felt by the vehicle operator. Because of the damping provided by microcellular urethane, the use of microcellular urethane as the outer bumper eliminates much suspension noise that would have been cause by the strong rebound or kick-back of rubber.

An end rib 78 formed on the radially exterior portion of the opened end 68 of the outer bumper 72 provides a feature that, through engagement with the radially inward extending fingers 60, allows retainment of the outer bumper 72 in the insert 46. Through the press-fit of insert 46 to the rigid body member 30, outer bumper 72 is also retained fixedly with respect to rigid body member 30. The cylindrical cavity 70 of the outer bumper 72 has a peripheral wall 64, which is the radially inner surface of the tube portion of the outer bumper 72.

The inner bumper 62 is formed in a substantially cylindrical bullet shape from rubber and is substantially solid, except for the central axial drain hole. Due to the higher force versus deflection characteristics of rubber as compared to urethane, inner bumper 62 provides a harder stop, forcing the cessation of relative movement of the suspension in extreme cases of the suspension bottoming out.

Elastic deformation of the inner bumper 62 occurs only when the outer bumper 72 is deformed to the extent that closed end inner surfaces 80 and/or 82 contact the inner bumper 62. Thus, during suspension events in which outer bumper 72 is deformed, but inner bumper 62 is not deformed, the lower force versus deflection curve of the outer bumper 72 provides a soft bumper operation for the vehicle and, therefore, tends to prevent the occurrence of suspension noise and ride harshness. When events occur that also cause deformation of inner bumper 62, then the suspension event is damped first by outer bumper 72 and then by the combination of outer bumper 72 and inner bumper 62, thus also reducing suspension noise and harshness during large suspension events that cause deformation of inner bumper 62. This optimizes entry feel of the bumper, which reduces bumper noise while providing sufficient bumper force. An axial length of interface 65 between the inner wall 64 of outer bumper 72 and outer surface 66 of inner bumper 62 controls the increase in spring rate of the outer bumper 72 so that the increase in force provided by the bumper 72 during compression is constant and smooth, with no noticeable transition in rate between the microcellular urethane 72 and the rubber inner bumper 62. This will be explained in more detail further below.

The inner bumper 62 may have an exterior cylindrical surface 66 having a circumference substantially the same as the inner circumference of surface 64 so that a slight friction fit may be obtained between the inner wall 64 of outer bumper 72 and the outer surface 66 of inner bumper 62. Before the outer bumper 72 is snapped in place by the fingers 60 and the end rib 78, the rubber bullet 62 is placed in the cavity 70. With the inner bumper 62 within cavity 70, the outer bumper 72 is snapped in place so that the fingers 60 retain outer bumper 72 in place through the holding action on the rib 78, at which point the inner bumper 62 is trapped between the interior closed end surfaces 80 and 82 and the interior cylindrical surface 64 of outer bumper 72 and the surface 50 of the closed end 48 of insert 46. The friction fit mentioned above between the inner bumper 62 and outer bumper 72 is optional, however, the axial length of radial interference determines how much rubber traps the urethane and controls the amount of passive rate change in the urethane.

As can be seen in the example shown in FIG. 4, the combination spring seat and jounce bumper 12 is substantially circular and symmetrical in shape, thus being properly aligned in any angular position in which the spring seat and jounce bumper 12 is axially aligned to the spring 14 and to the body seat 10. In the example shown in FIG. 4, the rubber seat 42 comprises 16 equally spaced lugs 43 forming valleys 84 between the neighboring lugs.

References 77 and 79 denote the voids between the annular ribs 76 and 78 on the exterior of outer bumper 72 and references 81 and 83 denote the voids between the surfaces 82, 80 and the inner bumper 62. Operation of this invention to affect a smooth passive increase in the spring rate of the microcellular urethane outer bumper 72 operates as follows.

Typically, microcellular urethane can be compressed 80% of its non-compressed height and the compression response is affected by the voids 77, 79, 81 and 83 that the urethane has to fill as it collapses. As compression of the jounce bumper begins, outer bumper 72 begins to compress. As outer bumper 72 begins to compress, it begins to collapse to fill the voids 77, 79 between the ribs and voids 81 and 83 within cavity 70. As the voids become filled, inner bumper 62 begins to compress. However, at this point inner bumper has no place to compress to because of the disappearance of voids 81 and 83. The result is a trapping force acting on the cylindrical end 68 of the outer bumper 72 between the inner bumper 62 at the interfacing portion 65 and the cylindrical wall of cylindrical body 52. As mentioned above, typically, microcellular urethane can collapse to 20% of its non-compressed height. However, when the end 68 of the microcellular urethane becomes trapped (by radial or transversal force) according to this invention, the trapping force affects the collapse response of the microcellular urethane, such that urethane that, un-trapped, could have collapsed to 20% of its non-compressed height, can be collapsed to only 30, 40, 50%, etc. of its non-compressed height, the fully collapsed height percentage increasing as the trapping force increases. This is referred to as a reduction in the working height of bumper 72. The effect of this on the compression force response is a passive increase in the spring rate of the microcellular urethane bumper 72 as the trapping force increases. This passive increase in spring rate is smooth and continuous.

The rate of passive increase in the spring rate or elasticity modulus of the outer bumper 72 may be varied by a designer for a specific implementation by varying the size and location of voids 77, 79, 81 and 83 and the length of interface 65.

The smooth and continuous passive increase in spring rate of the jounce bumper according to this invention compares to the prior art as follows. In bumpers in which the only working force is provided by microcellular urethane, the bumper requires a large amount of urethane (as compared to rubber) to provide a suitable stop, which is the result of the typically slow increase in force rate of urethane alone.

In rubber bumpers, it is common to mold a metal stop into the bumper to keep the bumper from bottoming out. The effect of this stop is noticed as a drastic increase in the spring force after the bumper is compressed a certain amount. In contrast to this invention, the increase in spring force provided by the metal stop is not a smooth and continuous increase but is a relatively sudden increase, which can have an adverse effect on suspension noise. This invention has advantages over these examples of prior an by decreasing the amount of urethane used in the bumper, making the bumper less expensive than a solid urethane counterpart, and by providing a smooth continuous increase in spring rate as compression increases, eliminating suspension noise and harshness.

The bumper of this invention builds a high force rate in a relatively short compression stroke, allowing the bumper to be shorter. The free travel of the suspension is the travel over which the bumper stop does not contact the bumper and is reduced by taller bumpers. By building the high force rate into a relatively short compression stroke, this invention maximizes the free travel of the suspension.

Although the apparatus of this invention above is described with specific materials such as rubber and microcellular urethane used as the elastic materials, and steel used for the rigid materials, one skilled in the art will appreciate that any material substitutions for the elastomeric materials and rigid materials capable of performing the same function or equivalent functions are encompassed within the scope of the invention.

The example suspension system using this invention described above implements the combination jounce bumper and spring seat between the coil spring and vehicle body. Those skilled in the an appreciate that the suspension system can alternatively implement the jounce bumper and spring seat between the coil spring and the wheel assembly or axle, in which case a bumper stop would be placed on the vehicle body. Such an implementation is easily achieved by one skilled in the an in view of the teachings herein.

Additionally, the above-described implementation of this invention is an example implementation and is not limiting on the scope thereof. Moreover, various other improvements and modifications to this invention may occur to those skilled in the art and such improvements and modifications will fall within the scope of this invention as set forth below.

The embodiments of this invention in which an exclusive property or privilege is claimed are defined as follows:

1. In a vehicle suspension system including a bumper stop, a jounce bumper comprising:

a rigid support having a rigid cylindrical wall, a first open end and a first substantially closed end;

a first bumper member having a second open end and a second substantially closed end, the first bumper member defining a cylindrical passage bordered by an inner cylindrical wall at the second open end, wherein the second open end is mounted radially interior of the rigid cylindrical wall and abuts the first substantially closed end of the rigid support; and a second bumper member of cylindrical shape and size to fit within the cylindrical passage, having a radially exterior surface radially interfacing with a predetermined axial length of the inner cylindrical wall, wherein the second bumper member is trapped between the second substantially closed end of the first bumper member and the first substantially closed end of the rigid support, wherein, during compression of the first bumper member, the second bumper member axially compresses and creates a radially outwardly directed force that cooperates with the rigid cylindrical wall to trap the second open end of the first bumper member between the second bumper member and the cylindrical wall, resulting in a decrease in the potential compression of the first bumper member, wherein the spring rate of the first bumper member is passively increased by the second bumper member cooperating with the rigid cylindrical wall.

2. The jounce bumper of claim 1 wherein the first bumper member comprises microcellular urethane and the second bumper member comprises rubber.

3. The jounce bumper set forth in claim 1, also comprising a rigid body member having a tubular end to which the rigid support is mounted and maintained in place by a press-fit.

4. The jounce bumper set forth in claim 3, wherein the rigid body member also has a flared end and wherein the apparatus also comprises:

an elastomeric spring seat integrally molded to the flared end forming an annular body integral with and radially exterior the flared end.

5. The jounce bumper set forth in claim 3, wherein the rigid body member also includes a cylindrical end opposite the tubular end, wherein the apparatus also comprises:

an elastomeric spring seat forming an annular body radially exterior the cylindrical end.

6. The jounce bumper set forth in claim 3 wherein the rigid support has, on the first open end, a radially outwardly extending flange that covers an axial end of the tubular end of the rigid body member.

7. The jounce bumper set forth in claim 1 wherein the first bumper member has exterior annular ribs, between which is at least one void that, during compression of the first bumper member, is filled by the compressing first bumper member.

8. In a vehicle suspension system including a bumper stop, a jounce bumper comprising:

a first rigid support comprising a circular cylindrical first end and a radially flared second end;

an elastomeric spring seat integrally molded to the radially flared second end of the first rigid support forming an annular body integral with and radially exterior of the flared end;

a second rigid support having a rigid cylindrical wall, a first open end and a planar substantially closed end, wherein the rigid cylindrical wall is press-fit into the circular cylindrical first end of the first rigid support, wherein the planar substantially closed end is axially interior of the circular cylindrical first end of the first rigid support and the first open end is axially exterior of the circular cylindrical first end of the first rigid support;

an outer bumper member having a second open end and a substantially closed end, the outer bumper member defining a cylindrical passage bordered by an inner cylindrical wall at the second open end, wherein the second open end is mounted radially interior of the rigid cylindrical wall and abuts the planar substantially closed end of the second rigid support; and a substantially solid inner bumper member of cylindrical shape and size to fit within the cylindrical passage, having a radially exterior surface radially interfering with a predetermined axial length of the inner cylindrical wall, wherein, during compression of the outer bumper member, the inner bumper member cooperates with the rigid cylindrical wall to trap the second open end of the outer bumper member, wherein the spring rate of the outer bumper is passively increased by the inner bumper cooperating with the rigid cylindrical wall.

9. The jounce bumper of claim 8 wherein the first bumper member comprises microcellular urethane and the second bumper member comprises rubber.

10. In a vehicle suspension system including a bumper stop, a jounce bumper comprising:

a rigid support having a rigid cylindrical wall, a first open end and a first substantially closed end;

an outer bumper member having second open end and a second substantially closed end, the outer bumper member defining a cylindrical passage bordered by an inner cylindrical wall at the second open end, wherein the second open end is mounted radially interior of the rigid cylindrical wall and abuts the first substantially closed end of the rigid support; and an inner bumper member of cylindrical shape and size to fit within the cylindrical passage, having a radially exterior surface radially interfering with a predetermined axial length of the inner cylindrical wall, wherein the inner bumper member is trapped between the second substantially closed end of the outer bumper member and the first substantially closed end of the rigid support wherein, during compression of the outer bumper member, the inner bumper member cooperates with the rigid cylindrical wall to trap the second open end of the outer bumper member, wherein the spring rate of the outer bumper is passively increased by the inner bumper cooperating with the rigid cylindrical wall.

* * * * *